Patented Aug. 7, 1928.

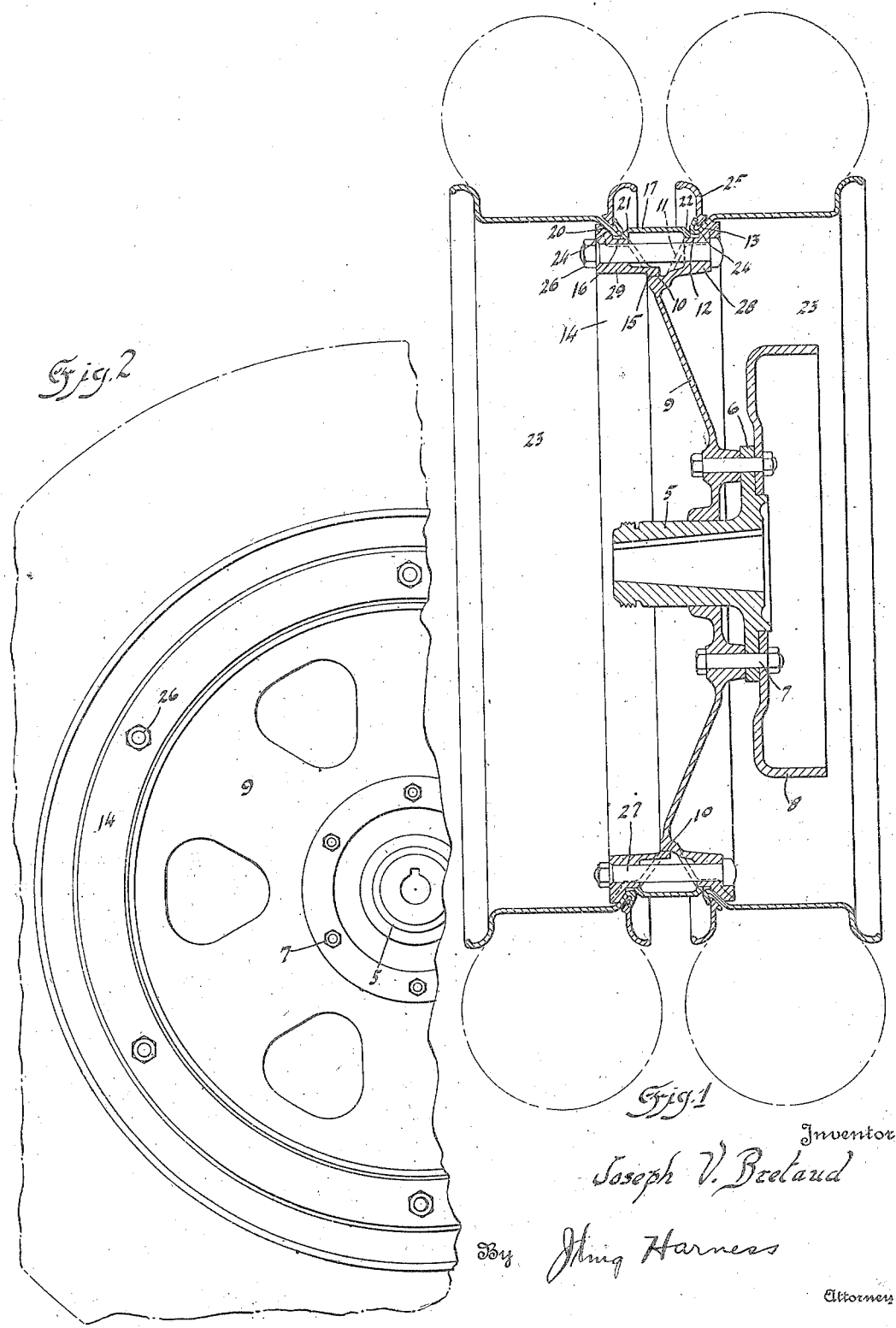

1,679,892

UNITED STATES PATENT OFFICE.

JOSEPH V. BRETAUD, OF DETROIT, MICHIGAN, ASSIGNOR TO SWEDISH CRUCIBLE STEEL COMPANY, A CORPORATION OF MICHIGAN.

WHEEL AND RIM MOUNTING.

Application filed May 13, 1927. Serial No. 190,975.

One of the primary objects of my invention is to provide a simple and economical construction for the provision of dual tires on a single wheel.

Another object of my invention is to provide such a construction adapted to receive standard rims and tires as they are furnished by certain manufacturers.

Another object of my invention is to provide means for quickly and easily assembling and disassembling the tires whereby changes may be made with a minimum of difficulty.

A further object is to provide such a construction wherein a plurality of spaced bolts are adapted to secure both tires in place on the wheel, and are so arranged as to be relieved of any radial loads.

With the above and other objects in view, my invention consists in the arrangement, combination and construction of the various parts of my improved device, as described in the specification, claimed in my claims and shown in the acompanying drawing, in which:

Fig. 1 is a central sectional view showing a wheel whereon my invention is employed.

Fig. 2 is a fragmentary view, in front elevation, of the same.

My improved construction comprises a wheel hub 5 which is adapted to be mounted upon a conventional axle and is provided with a radial flange 6 to which is secured by means of bolts 7 a brake drum 8. The bolts 7 also secure in place a disc wheel 9 having its center bearing on the hub 5 as is particularly shown in Fig. 1. While I have here shown and described my invention as applied to a disc wheel, it will be readily understood that the same may be employed with various other types of wheels.

The wheel 9 is provided with a circumferential felly portion or seat 10 from which is extended a web 11 having a flat circumferential seat 12 and a tapered circumferential seat 13. A ring 14 is provided with a portion 15 which is adapted to fit on the seat 10 and is also provided with a circumferential seat 20 similar to the seat 13. A spacer ring 17 is provided between the ring 14 and the web 11, said spacer bearing respectively on the seats 12 and 16 and being provided with a pair of oppositely tapered seats 21 and 22. The seats 13 and 22 cooperate to form a V groove between them, as do also the seats 20 and 21.

A pair of similar tire rims 23 having conventional tires mounted thereon are provided, said rims being of a well-known construction wherein a rib or bead 24 is provided on one side thereof for the reception of a tire retaining ring 25. In mounting these rims on my improved wheel, the ribs or beads 24 are oppositely faced so that the rib or bead on the inner rim faces outwardly and the rib or bead on the outer rim faces inwardly. One of these beads fits in the V groove between the seats 13 and 22, while the other fits in the V groove between the seats 20 and 21. These beads are wedged in place by tightening the nuts 26 on the bolts 27 which are extended through lugs 28 on the web 11 and lugs 29 on the ring 14.

It will be readily apparent that by loosening the nuts 26 and removing ring 14, the outer rim may be removed. For removal of the inner rim the spacer ring 17 is also removed permitting the inner rim to slide easily from the wheel. When assembling, the inner rim is placed in position, the ring 17 slipped in place followed by the addition of the outer rim and the ring 14 after which the nuts 26 may be tightened to secure the entire assembly together. Because of the provision of lugs 28 and 29 no radial load is imposed upon the bolts 27, and the wedging of the beads on the rims between their respective seats serves to rigidly hold the rims with their tires in place.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. A wheel comprising a hub and felly portion, a web extending from the felly portion and embodying a circular and a tapered seat, a tire rim having a rib bearing at one side on the tapered seat, a spacer ring having a tapered circumferential seat bearing on the other side of said rib and a circular seat bearing on the circular seat of the web, a demountable ring bearing at one edge on the felly, said ring having a circular and a tapered seat, a second circular and tapered seat on the spacer ring, the former bearing on the circular seat of the demountable ring, a second tire rim having a rib engaged between the two latter tapered seats and means for drawing the four tapered seats toward each other to wedge the ribs between the two pairs of them and thereby support and secure the rims.

2. A wheel comprising a hub and felly portion, a web extending from the felly portion and embodying a circular and a tapered seat, a tire rim having a rib bearing at one side on the tapered seat, a spacer ring having a tapered circumferential seat bearing on the other side of said rib and a circular seat bearing on the circular seat of the web, a demountable ring bearing at one edge on the felly, said ring having a circular and a tapered seat, a second circular and tapered seat on the spacer ring, the former bearing on the circular seat of the demountable ring, a second tire rim having a rib engaged between the two latter tapered seats and means for drawing the four tapered seats toward each other to wedge the ribs beween the two pairs of them and thereby support and secure the rims, said means comprising bolts extended through apertured bosses in the demountable ring and web.

JOSEPH V. BRETAUD.